C. F. DAVIS.
Harvester Rake.
No. 2,800.
Reissued Nov. 19, 1867.
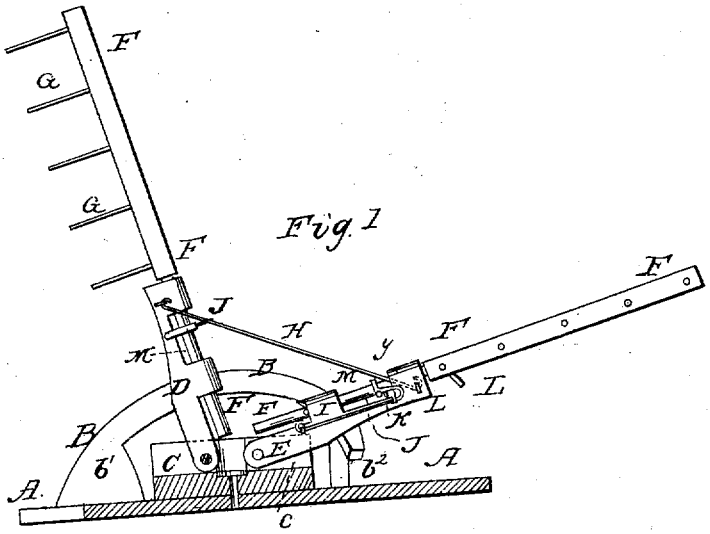
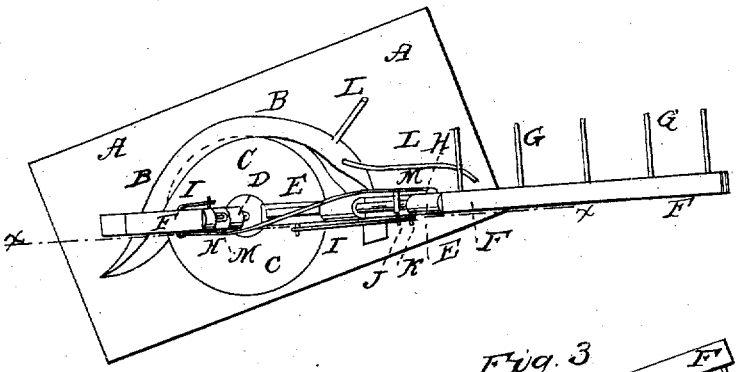
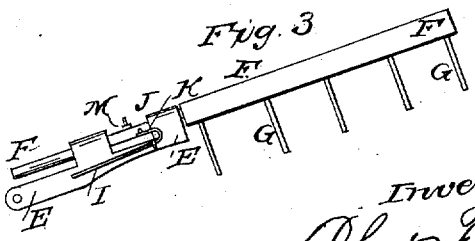
Witnesses
J. M. Blountes
Wm. Freman
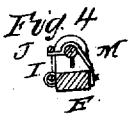
Inventor
Chas. F. Davis
Per Munn & Co
Attorneys
N. PETERS. Photo-Lithographer. Washington, D. C.

UNITED STATES PATENT OFFICE.

CHARLES F. DAVIS, OF AUBURN, NEW YORK.

IMPROVEMENT IN HARVESTER-RAKES.

Specification forming part of Letters Patent No. 54,871, dated May 22, 1866; Reissue No. 2,800, dated November 19, 1867.

*To all whom it may concern:*

Be it known that I, CHARLES F. DAVIS, of Auburn, in the county of Cayuga and State of New York, have invented a new and useful Improvement in Harvester-Rakes; and I do hereby declare the following to be a full, clear, and exact description of the same, reference being had to the accompanying drawings, making a part of this specification, in which—

Figure 1 represents a side view of my improved rake, partly in section, through the line *x x* of Fig. 2. Fig. 2 represents a top or plan view of the same. Fig. 3 represents a view of the rake detached and in position for sweeping the platform. Fig. 4 represents a section taken through the line *y y* of Fig. 1.

Similar letters of reference, where they occur in the several figures, denote like parts in all the drawings.

My invention consists, first, in the combination of a stop controlled by the driver, so arranged with the hinged rake-head of a reel-rake that the driver can at pleasure change the heads from rakes to beaters and from beaters to rakes, for the purpose of controlling the size of the gavels; and my invention further consists in combining, with the rake-head of a combined rake and reel that is thrown out of action by the operator riding on the machine, a mechanism by which it is automatically thrown again into action.

To enable others skilled in the art to make and use my invention, I will proceed to describe the same with reference to the drawings.

A represents the platform or part of the harvester to which the rake is attached.

B is the frame or guide by which the rakes are raised up so as to pass over the driver, and again allowed to descend and act as a reel in bringing and holding the grain against the cutters and as a rake to sweep the gavels from the platform when desirable so to do. The guide B is held up or supported by the supports $b^1$ $b^2$, as seen in Fig. 1.

C is a revolving support, to which the arms that carry the rake-heads are pivoted. This support C is pivoted to the platform A, as shown in Fig. 1, and the central part of its upper side is hollowed out, as shown, to allow space for the downward projection of the inner ends of the rake-head bars as the rake-head approaches a vertical position in passing along the guide B. The support C is slotted from the central chamber to its outer edge, as shown in Fig. 1, and within these slots are pivoted the lower ends of the arms D and E, that carry the rake-heads. The number of these slots should equal the number of rake-heads intended to be used. Upon the upper edges of the arms D and E are formed projections, in which are made the bearings of the rake-head shafts, as shown in Figs. 1, 2, and 3. As the rakes revolve the under sides of the arms D and E slide along the guide B and raise and lower the rake-heads.

F F are the rake-head bars, from one side of the projecting ends of which the teeth G project, as shown in the drawings. The lower or inner ends of these bars are rounded off and work in the bearings formed upon the upper sides of the arms D and E, as before described. The arms D and E and the rake-heads F are kept at the same distance from each other, and the one is pushed down as the other rises by a bar, H, pivoted to opposite sides of two opposite arms, as shown in Figs. 1 and 2.

I are latches pivoted to the support C, as shown in Figs. 1 and 2, and slide in keepers attached to the arms D and E as the said arms rise and fall while passing along the guide B. The upper ends of these latches are bent over so as to form hooks, which take over catches J and K attached to the lower part of the rake-head bars F and hold the said rake-heads in the desired position while passing over the platform of the harvester.

L is a lever, so placed as to be under the control of the driver, and connected with the guide B. By projecting this lever upward as the rake-heads pass down the guide B the lower tooth of the rake-head will come in contact with the said lever L, and the rake-head will be revolved into the position shown in Figs. 1 and 2, so as to pass over the platform without coming in contact with the grain thereon. This revolution brings the catch J into such a position that it catches upon the latch I, and the rake-head is held in that position until it begins to rise at the other end of the guide B. This rise of the rake-head frees the catch J from the latch I, and the rake-head is immediately drawn back into its former position by the action of the spring M. The spring M is attached to the arms D and E at one end and at the other end to the catch J, as represented in the drawings, and may be a rubber spring, as shown in the drawings, or it may be a coiled-wire spring, or any other kind of a spring, provided it is attached to the bar F in such a way as to revolve the rake-head when released from the latch I. When the rake-head is allowed to pass the lever L without coming in contact therewith, the teeth G sweep the gavel from the platform in the ordinary manner; and, when in this position, the rake-head is prevented from being revolved by the weight of the grain by the action of the catches K, which catch upon the latches I, as shown in Fig. 3, and hold the rake-head in that position until released by its rise at the other end of the guide B, as before described.

Having thus fully described the nature, object, and purpose of my invention, what I claim therein as new, and desire to secure by Letters Patent, is—

1. The combination of a stop-lever, L, controlled by the driver, with the hinged rake-head of a reel-rake, and so arranged that the driver can at pleasure, by moving the stop-lever out or in, change the heads from rakes to beaters and from beaters to rakes, for the purpose of controlling the size of the gavels, substantially as set forth.

2. I also claim, in combination with the rake-head of a combined rake and reel that is thrown out of action by the operator riding on the machine, a mechanism by which it is automatically thrown again into action, substantially as described and represented.

CHARLES F. DAVIS.

Witnesses:

SAMUEL LOCKWOOD,
CHAS. E. BAKER.